Nov. 3, 1964   S. D. LESESNE   3,155,728
METHOD FOR THE PREPARATION OF POLYGLYCOL PRIMARY AMINE
Filed Oct. 11, 1960
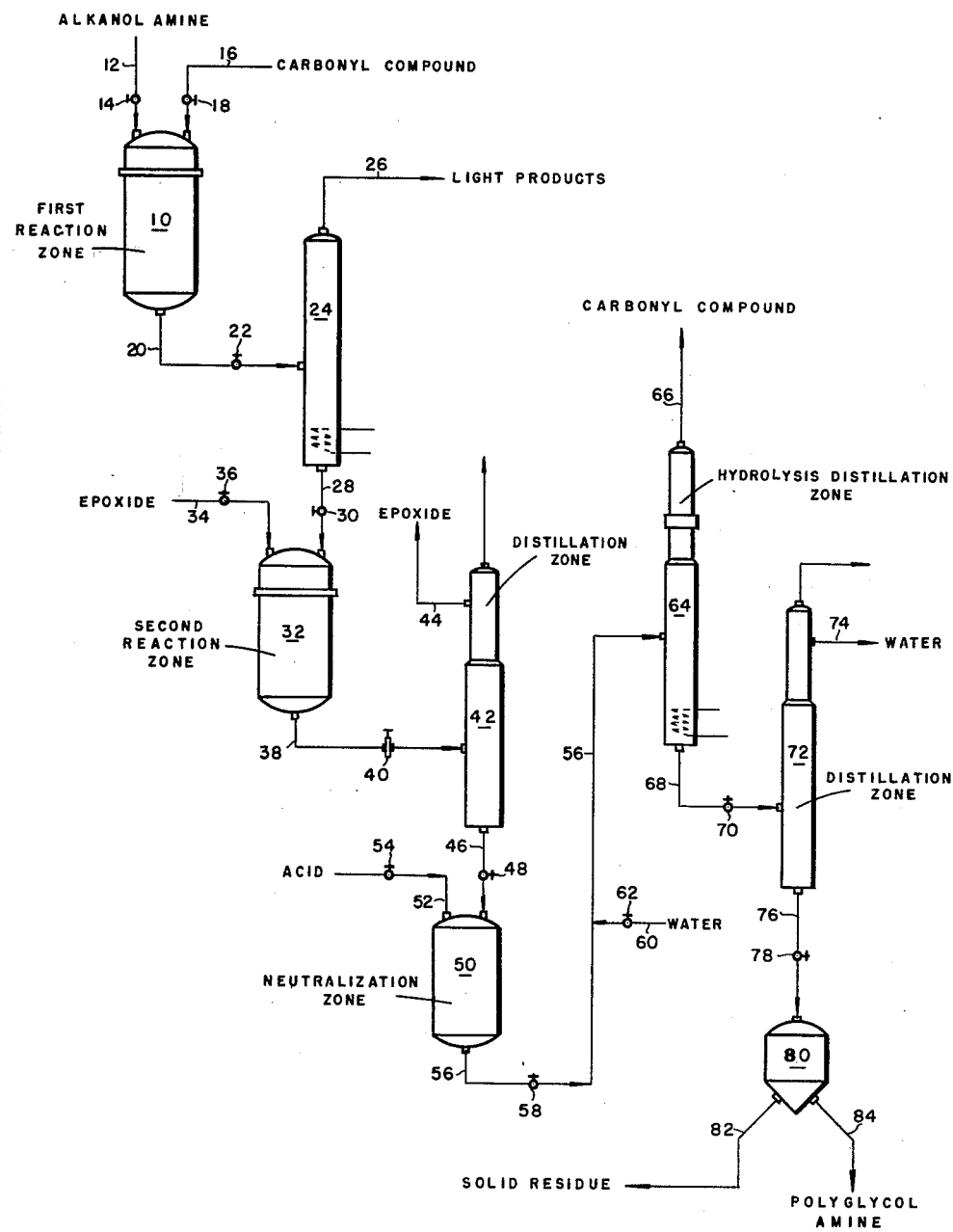
INVENTOR.
SHERMAN D. LESESNE,
BY
ATTORNEY.

3,155,728
METHOD FOR THE PREPARATION OF POLY-GLYCOL PRIMARY AMINE
Sherman D. Lesesne, Georgetown, Tex., assignor to Jefferson Chemical Company, Inc., Houston, Tex., a corporation of Delaware
Filed Oct. 11, 1960, Ser. No. 61,982
4 Claims. (Cl. 260—584)

This invention relates to an improved method for the preparation of basic polyether compositions. More particularly, this invention relates to a method for the preparation of primary amine derivatives of polyalkylene glycols.

In co-pending application, Serial No. 860,317, filed December 18, 1959, now Patent No. 3,110,732 for Speranza et al. and entitled Method for Preparing Basic Polyether Compositions a method is disclosed wherein a carbonyl compound is reacted with a primary alkanolamine to form an addition product such as a Schiff base, wherein the addition product is reacted with an alkylene oxide to form an alkylene oxide adduct and wherein the adduct is hydrolyzed to regenerate the carbonyl compound and to provide a primary amine derivative of a polyalkylene glycol, which is the desired product. The products prepared in this fashion are useful for a variety of purposes. Thus, they may be used as foam-stabilizers, in low foaming soaps, anti-static agents in plastics, etc. Such products are disclosed and claimed in co-pending Speranza application, Serial No. 860,356, filed December 18, 1959, and entitled Basic Polyether Compositions.

While the results that have been obtained in practicing the process of the co-pending Speranza et al. application, Serial No. 860,317, have been generally satisfactory, it has been discovered in accordance with the present invention that a problem is encountered in conducting the process if the reaction product is to contain a maximized amount of primary amine derivatives in excess of 95 wt. percent. Thus it has been discovered that minor amounts of alkylene oxide (normally less than 0.5 weight percent) are present in the alkylene oxide adduct of the Schiff base and that the unreacted alkylene oxide tends to react with primary amine groups during hydrolysis to form objectionable secondary or tertiary amine groups. Accordingly, in accordance with the present invention, the alkylene oxide adduct of the addition product (e.g. Schiff base) is treated for the removal of the trace quantities of unreacted alkylene oxide that are normally present therein before the adduct is subjected to hydrolysis. Although any desirable removal system may be used, a preferred removal system involves stripping for the removal of unreacted alkylene oxide.

The invention will be further illustrated with respect to the accompanying drawing wherein the single figure is a schematic flow sheet illustrating a preferred method for practicing the process of the present invention.

Turning now to the drawing, there is shown a first reaction zone 10 to which an alkanolamine amine may be charged by way of the line 12 controlled by a valve 14 and to which a carbonyl compound may be charged by way of a line 16 controlled by a valve 18. A wide variety of alkanolamines, such as monoethanolamine, 1-amino-2-propanol, 2-amino-1-propanol, 3-amino-1-propanol, 2-(2-aminoethoxy) ethanol, 1-amino-2-butanol, 2-amino-3-butanol, etc. and mixtures thereof may be used. In like fashion a wide variety of carbonyl compounds including aldehydes such as isobutyraldehyde, 2-ethyl-hexaldehyde, etc., and ketones such as methyl ethyl ketone, methyl isobutyl ketone, ethyl isobutyl ketone, diethyl ketone, etc. may be used.

The carbonyl compound and the alkanolamine amine are preferably employed in approximately equimolar amounts in the presence or absence of a solvent, an inert carbonyl solvent, such as benzene, if desired, under basic reaction conditions including, for example, a temperature of about 70° to about 175° C. and a reaction time of 10 to 80 hours. As a consequence of the reaction of the carbonyl compound with the alkanolamine amine under basic conditions, an addition product (e.g. a Schiff base) is formed.

As a next step, the reaction mixture in the first reaction zone 10 may be discharged by way of a line 20 controlled by a valve 22 leading to a suitable fractionation zone such as a distillation column 24 wherein lighter components of the reaction mixture, including water, solvent, if any, and unreacted alkanolamine amine or carbonyl compounds are removed overhead by way of a line 26. The bottoms from zone 24, composed primarily of the Schiff base, are discharged by way of a line 28 controlled by a valve 30 leading to a second reaction zone 32. There is also charged to reaction zone 32 by way of a line 34 controlled by a valve 36 an alkylene oxide such as ethylene oxide, propylene oxide, 1,2-butylene oxide, 2,3-butylene oxide, etc. and mixtures thereof together with an oxyalkylation catalyst such as sodium, sodium hydride, sodium amide, sodium hydroxide, sodium methoxide, sodium ethoxide, etc. or a corresponding potassium compound or an approprite mixture of two or more such compounds.

Reaction conditions maintained in the reaction zone 32 may include, for example, a temperature of about 40° to 200° C., a pressure of about 0 to 100 p.s.i.g. and reaction times of within the range of about 1 to 6 hours. From about 0.01 to about 1 mol of catalyst per mol of Schiff base may be employed and from 1 to 100 mols of alkylene oxide per mol of Schiff base may be employed.

As a result of the reaction, an alkylene oxide adduct of the Schiff base is formed.

The alkylene oxide adduct is recovered in accordance with the present invention by discharging the reaction mixture from the zone 32 by way of a line 38 containing a pressure reduction valve 40 leading to an alkylene oxide removal zone such as a vacuum stripping zone 42. Within the zone 42 the products are fractionated under a vacuum of from about 1 to 20 mm. of mercury into a light fraction discharged by way of line 44 containing by-products and substantially all of the unreacted alkylene oxide initially present in the reaction mixture discharged from the second reaction zone 32.

The bottoms fraction from zone 42 consisting essentially of the adduct of the Schiff base is discharged by way of a line 46 controlled by a valve 48 leading to a neutralization zone 50 where the adduct is treated with an acid such as hydrochloric acid, sulfuric acid, phosphoric acid, propionic acid, etc., added by way of line 52 controlled by valve 54 in order to acidify the adduct.

The acidified adduct is discharged from neutralization zone 50 by way of a line 56 controlled by a valve 58 and, together with water added by a line 60 controlled by a valve 62 is discharged to a combination hydrolysis-distillation zone 64 wherein hydrolysis of the adduct is effected (e.g. at the boiling point of water for the pressure employed) in order to regenerate the carbonyl compound initially added by line 16 and in order to provide for the formation of the desired primary amine derivative. In accordance with this embodiment, the carbonyl compound is removed overhead from zone 64 by way of a line 66 for any desired purpose such as recycle.

The bottoms from the zone 64 is discharged by way of a line 68 controlled by a valve 70 leading to an appropriate distillation zone such as a vacuum distillation zone 72 wherein water and by-products boiling below the boiling range of the primary amine derivative are removed overhead for discharge through a line 74.

Bottoms from the distillation zone 72 is discharged by way of line 76 controlled by a valve 78 leading to a final purification zone such as a filtration zone 80 wherein solid residues are removed from the primary amine product for discharge through a line 82.

The desired polyglycol amine is removed from zone 80 by a line 84.

The invention will be further illustrated by the following specific examples which are given as illustrations and not as limitations on the scope of this invention.

*Example 1*

About 3 mols of monoethanolamine were reacted with about 4 mols of diethyl ketone in a flask fitted with a reflux condenser in order to prepare a Schiff base. The Schiff base was recovered and about 2 mols of the Schiff base and about 40 grams of metallic sodium were added to an autoclave which was closed, evacuated, flushed with nitrogen and heated to 65° C. Thereafter about 1,900 grams of ethylene oxide were added over a four-hour period while maintaining the autoclave at about 65° C. and a pressure of 40 p.s.i.g.

Thereafter 12 portions of the thus prepared adduct were separately treated.

In runs 1 to 6 the reaction product was treated directly with water and hydrochloric acid to provide a solution having a pH of about 11 and in order to regenerate the diethyl ketone and provide the polyglycol amine.

In runs 7 to 12 vacuum distillation first used to remove the trace quantities of ethylene oxide that were present and the runs were then made as just described above with respect to samples 1 to 6.

The results obtained with respect to analysis of the fractions for primary amines are set forth in the following table:

| Without removal of oxide | | With removal of Oxide | |
| --- | --- | --- | --- |
| Run No. | Percent Primary Amine | Run No. | Percent Primary Amine |
| 1 | 97.7 | 7 | 99.0 |
| 2 | 91.7 | 8 | 94.4 |
| 3 | 84.0 | 9 | 99.2 |
| 4 | 85.8 | 10 | 96.3 |
| 5 | 93.5 | 11 | 100.0 |
| 6 | 98.3 | 12 | 97.0 |
| Average | 91.8 | Average | 97.3 |

From the foregoing table it is seen that a significant improvement in primary amine content was obtained in runs 7 to 12.

It will be understood that the addition product of the alkanolamine and carbonyl compound will normally be a Schiff base or an oxazolidine or an equilibrium mixture thereof (see, for example, the article by E. C. Bergman in Chemical Reviews for 1953; 53, 309). This presents no problem because, under the basic conditions of adduct formation (i.e. in zone 32) any oxazolidine present in the reaction mixture will tend to isomerize to the corresponding Schiff base, which will be the compound that reacts with the epoxide.

What is claimed is:

1. A method of preparing a polyglycol primary amine which comprises the steps of:
   (1) reacting an aliphatic carbonyl compound containing from 3 to 8 carbon atoms with about an equimolar amount of a primary alkanolamine containing from 2 to 4 carbon atoms in the absence of a solvent at a temperature within the range of about 70° to about 175° C. for a period of time within the range of about 10 to about 80 hours to provide a Schiff base;
   (2) reacting said Schiff base with from about 1 to about 100 mols per mol of Schiff base of an alkylene oxide containing 2 to 4 carbon atoms in the presence of an oxyalkylation catalyst at a temperature within the range of about 40° to about 200° C. and a pressure within the range of about 0 to 1000 p.s.i.g. for a period of time within the range of about 1 to 6 hours to form an alkylene oxide adduct of said Schiff base;
   (3) subjecting said alkylene oxide adduct to vacuum stripping at a pressure from 1 to 20 mm. of mercury to substantially completely remove unreacted alkylene oxide;
   (4) contacting said stripped adduct with an amount of acid sufficient to neutralize said adduct;
   (5) hydrolyzing said neutralized adduct with water at about the boiling point of water to form said polyglycol primary amine; and
   (6) recovering said polyglycol primary amine from the products of said hydrolysis reaction.

2. A method as in claim 1 wherein the carbonyl compound is diethylketone, the alkanolamine is monoethanolamine and the alkylene oxide is ethylene oxide.

3. A method of preparing a polyglycol primary amine which comprises the steps of:
   (1) reacting an aliphatic carbonyl compound containing from 3 to 8 carbon atoms with about an equimolar amount of a primary alkanolamine containing from 2 to 4 carbon atoms in the absence of a solvent at a temperature within the range of about 70° to about 175° C. for a period of time within the range of about 10 to about 80 hours to provide a Schiff base;
   (2) reacting said Schiff base with from about 1 to about 100 mols per mol of Schiff base of an alkylene oxide containing 2 to 4 carbon atoms in a solvent-free system in the presence of an oxyalkylation catalyst at a temperature within the range of about 40° to about 200° C. and a pressure within the range of about 0 to 1000 p.s.i.g. for a period of time within the range of about 1 to 6 hours to form an alkylene oxide adduct of said Schiff base;
   (3) subjecting said alkylene oxide adduct to vacuum stripping at a pressure of from 1 to 20 mm. of mercury to substantially completely remove unreacted alkylene oxide;
   (4) contacting said stripped adduct with an amount of acid sufficient to neutralize said adduct;
   (5) hydrolizing said neutralized adduct with water at about the boiling point of water to form said polyglycol primary amine; and
   (6) recovering said polyglycol primary amine from the products of said hydrolysis reaction.

4. A method as in claim 3 wherein the carbonyl compound is diethylketone, the alkanolamine is monoethanolamine and the alkylene oxide is ethylene oxide.

References Cited in the file of this patent

UNITED STATES PATENTS 2,629,740    Carnes    Feb. 24, 1953